US009407423B2

(12) United States Patent
Beale et al.

(10) Patent No.: US 9,407,423 B2
(45) Date of Patent: *Aug. 2, 2016

(54) DUPLEX OPERATION IN A CELLULAR COMMUNICATION SYSTEM

(71) Applicant: Sony Corporation, Tokyo (JP)

(72) Inventors: Martin Warwick Beale, Bristol (GB); Alan E. Jones, Wiltshire (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/042,112

(22) Filed: Sep. 30, 2013

(65) Prior Publication Data

US 2014/0029479 A1    Jan. 30, 2014

Related U.S. Application Data

(63) Continuation of application No. 13/946,416, filed on Jul. 19, 2013, which is a continuation of application No. 11/240,720, filed on Sep. 30, 2005, now Pat. No. 8,493,926.

(30) Foreign Application Priority Data

Aug. 19, 2005 (GB) .................................. 0517128.5

(51) Int. Cl.
*H04B 1/56* (2006.01)
*H04L 5/14* (2006.01)
(Continued)

(52) U.S. Cl.
CPC ............ *H04L 5/1438* (2013.01); *H04B 7/2643* (2013.01); *H04W 48/10* (2013.01); *H04W 74/0833* (2013.01); *H04W 36/16* (2013.01); *H04W 76/02* (2013.01)

(58) Field of Classification Search
CPC ...... H04W 48/20; H04W 88/06; H04W 48/10; H04W 36/20; H04B 1/44; H04B 1/56
See application file for complete search history.

(56) References Cited

U.S. PATENT DOCUMENTS 4,485,486 A * 11/1984 Webb et al. ................... 455/450
5,121,382 A    6/1992 Yang et al.
(Continued)

FOREIGN PATENT DOCUMENTS

CN    1338192 A    3/1999
DE    3304451 C1    10/1984
(Continued)

OTHER PUBLICATIONS

U.S. Appl. No. 14/042,136, filed Sep. 30, 2013, Beale, et al.
(Continued)

*Primary Examiner* — Melanie Jagannathan
(74) *Attorney, Agent, or Firm* — Oblon, McClelland, Maier & Neustadt, L.L.P.

(57) ABSTRACT

A cellular communication system comprises a first base station serving at least a first user equipment. The base station comprises functionality for transmitting a base station duplex capability message to user equipments using a transmission format which is common to a plurality of duplex modes. A first user equipment comprises a transceiver which receives the base station duplex capability message. A RACH characteristics processor determines at least one transmit characteristic for an access message in response to the base station duplex capability message and a RACH transmit controller controls the transmission of an access message to the first base station in response to the at least one transmit characteristic.

19 Claims, 17 Drawing Sheets

(51) Int. Cl.
*H04W 48/10* (2009.01)
*H04W 74/08* (2009.01)
*H04B 7/26* (2006.01)
*H04W 36/16* (2009.01)
*H04W 76/02* (2009.01)

(56) References Cited

U.S. PATENT DOCUMENTS

| | | | |
|---|---|---|---|
| 5,678,189 | A | 10/1997 | Barnes |
| 5,881,369 | A | 3/1999 | Dean et al. |
| 6,167,283 | A | 12/2000 | Korpela et al. |
| 6,938,086 | B1 | 8/2005 | Banga |
| 7,822,420 | B1 | 10/2010 | Schulz |
| 7,890,113 | B2 * | 2/2011 | Jones et al. ............ 455/447 |
| 2001/0021178 | A1 | 9/2001 | Barabash et al. |
| 2002/0102948 | A1 | 8/2002 | Stanwood et al. |
| 2004/0157561 | A1 * | 8/2004 | Akerberg ......... H04W 36/20 455/67.11 |
| 2004/0252659 | A1 | 12/2004 | Yun et al. |
| 2006/0025165 | A1 | 2/2006 | Tillet et al. |
| 2006/0195576 | A1 | 8/2006 | Rinne et al. |
| 2006/0217124 | A1 * | 9/2006 | Bi ................. H04W 48/10 455/450 |
| 2007/0041347 | A1 * | 2/2007 | Beale et al. ............ 370/335 |
| 2009/0213765 | A1 | 8/2009 | Rinne et al. |
| 2011/0038283 | A1 | 2/2011 | Yu et al. |
| 2013/0039229 | A1 * | 2/2013 | Park et al. ............ 370/280 |

FOREIGN PATENT DOCUMENTS

| | | |
|---|---|---|
| EP | 1009183 A1 | 6/2000 |
| EP | 1 163 818 A1 | 9/2000 |
| EP | 1207636 A2 | 5/2002 |
| EP | 1207636 A3 | 5/2002 |
| EP | 1 259 092 A2 | 11/2002 |
| EP | 1 163 818 A1 | 8/2004 |
| EP | 1 503 610 A2 | 2/2005 |
| EP | 1 545 144 A1 | 6/2005 |
| GB | 2 398 455 A | 8/2004 |
| WO | WO 00/57660 A1 | 9/2000 |
| WO | WO 2004/107606 A1 | 12/2004 |
| WO | WO 2004/107606 A1 | 12/2004 |

OTHER PUBLICATIONS

Office Action issued Aug. 23, 2013 in Chinese Patent Application No. 201110238766 (with English Translation).

European Search Report issued Nov. 8, 2010 in EP Application No. 10162907.9 filed Aug. 18, 2006.

European Search Report issued Sep. 2, 2010 in EP Application No. 10164398.9 filed Aug. 18, 2006.

IEEE Computer Society and IEEEE Microwave Theory and Techniques Society, (2004), "IEEE Standard for Local and Metropolitan Area Networks, Part 16: Air Interface for Fixed Broadband Wireless Access Systems," IEEE Standards 802.16/2004, IEEE: New York, NY p. 659.

IEEE Computer Society and IEEE Microwave Theory and Techniques Society, (2002), "IEEE Standard for Local and Metropolitan Area Networks, Part 16: Air Interface for Fixed Broadband Wireless Access Systems," IEEE Standards 802.16-2001, IEEE: New York, NY, pp. 5, 44, 218, 224, 275.

Holma, H. et al. eds. (2001), *WCDMA for UMTS: Radio Access for Third Generation Mobile Communications*, John Wiley & Sons Ltd.: West Sussex, England, 10 pages (Table of Contents).

International Search Report mailed Dec. 4, 2006, for PCT Application No. PCT/EP2006/065445 filed Aug. 18, 2006, 2 pages.

Mouly, M. et al. (1992), *The GSM System for Mobile Communications*, Telecom Publishing: Olympia, Washington, 8 pages (Table of Contents).

IPWireless et al. (Nov. 2-3, 2004), "TD-CDMA: One Air-Interface Two Duplexing Methods," 3GPP UTRAN Evolution Workshop, Toronto, Canada, 10 pages.

IEEE (Jan. 6, 2006), "MBFDD and MBTDD: Proposed Draft Air Interface Specification," IEEE 802.20 Working Group on Mobile Broadband Wireless Access, located at <http://grouper.ieee.org/groups/802/20/Contribs/C802-20-06-04.pdf> visited on Feb. 16, 2006, pp. i-xxxiv (table of contents), 294, and 511-512.

GB Search and Examination Report mailed on Jan. 9, 2006 for GB patent application No. GB0517128.5, 5 pages.

Extended European Search Report issued Feb. 17, 2015 in Patent Application No. 14184548.7.

Office Action dated Aug. 5, 2015, in Chinese Patent Application No. 201310201921 (with English Translation).

\* cited by examiner

DUPLEX OPERATION IN A CELLULAR COMMUNICATION SYSTEM

CROSS-REFERENCE TO RELATED APPLICATIONS

This application is a continuation of and is based upon and claims the benefit of priority under 35 U.S.C. §120 for U.S. Ser. No. 13/946,416, filed Jul. 19, 2013 which is a continuation of U.S. Ser. No. 11/240,720, filed Sep. 30, 2005 (now U.S. Pat. No. 8,493,926), and claims the benefit of priority under 35 U.S.C. §119 from UK application GB 0517128.5 filed Aug. 19, 2005. The entire contents of which are incorporated herein by reference.

TECHNICAL FIELD

The invention relates to duplex operation in a cellular communication system and in particular, but not exclusively, to selection of a suitable duplex operation in a 3rd Generation cellular communication system.

BACKGROUND ART

In a cellular communication system a geographical region is divided into a number of cells each of which is served by a base station. The base stations are interconnected by a fixed network which can communicate data between the base stations. A mobile station is served via a radio communication link by the base station of the cell within which the mobile station is situated.

As a mobile station moves, it may move from the coverage of one base station to the coverage of another, i.e. from one cell to another. As the mobile station moves towards a base station, it enters a region of overlapping coverage of two base stations and within this overlap region it changes to be supported by the new base station. As the mobile station moves further into the new cell, it continues to be supported by the new base station. This is known as a handover or handoff of a mobile station between cells.

A typical cellular communication system extends coverage over typically an entire country and comprises hundreds or even thousands of cells supporting thousands or even millions of mobile stations. Communication from a mobile station to a base station is known as uplink, and communication from a base station to a mobile station is known as downlink.

The fixed network interconnecting the base stations is operable to route data between any two base stations, thereby enabling a mobile station in a cell to communicate with a mobile station in any other cell. In addition, the fixed network comprises gateway functions for interconnecting to external networks such as the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

Currently, the most ubiquitous cellular communication system is the 2nd generation communication system known as the Global System for Mobile communication (GSM). Further description of the GSM TDMA communication system can be found in 'The GSM System for Mobile Communications' by Michel Mouly and Marie Bernadette Pautet, Bay Foreign Language Books, 1992, ISBN 2950719007.

3rd generation systems are currently being rolled out to further enhance the communication services provided to mobile users. One such system is the Universal Mobile Telecommunication System (UMTS), which is currently being deployed. Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876. Third generation cellular communication systems are standardized in the $3^{rd}$ Generation Partnership Project (3GPP).

In a cellular communication system, user equipments attach to one (or more) base stations wirelessly. User equipments attach to base stations according to parameters such as signal quality for the base station, system information signaled from the base station (where the system information can contain parameters such as the identity of the network operator), handover commands from the network (where a base station may force a user equipment to attach to a different network due to issues such as relative signal quality, traffic load on base stations etc.) etc.

FIG. 1 illustrates an example of user equipments attaching to base stations of two different networks. The figure further illustrates that the two networks broadcast system information to all user equipments in the geographical area covered by the networks. The user equipments attach to base stations, not only on the basis of signal strength etc., but also on the basis of the network identity that is broadcast in this system information (hence subscribers to the first network only attach to base stations of the first network and subscribers of the second network only attach to base stations of the second network). The dashed lines in FIG. 1 illustrate the attachments between the user equipments and the base stations.

In 3GPP, a user equipment searching for a cell to attach to will generally attempt to attach to the cell from a preconfigured list that meets certain quality criteria (such as signal strength). The user equipment may for example comprise a preconfigured list of possible frequencies for suitable candidate cells (these frequencies can be programmed in a Subscriber Identity Module (SIM) where the SIM allows an operator to customize the user equipment to only search the frequencies that belong to that network operator). When a user equipment has identified a suitable cell, it will camp onto this and will extract the downlink frequency from the preconfigured list.

The 3GPP specifications specify that for the Frequency Duplex Division (FDD) mode of 3GPP, the uplink and downlink frequencies are paired according to an explicit relationship. Methods of signaling the uplink frequency on downlink messages are also considered for extensions of 3GPP to new frequency bands, e.g. in technical recommendation TR25.889. Thus, if the downlink frequency is known, so is the uplink frequency.

In the Time Division Duplex (TDD) mode of 3GPP, only a single frequency is used for uplink and downlink and the separation between these is achieved in the time domain. Thus, TDD utilizes an unpaired spectrum approach where the same frequency is used in both directions. In such systems, the base stations broadcast system information which contains characteristics of the random access channel and in particular this information comprises the timeslot number where RACH (Random Access CHannel) transmissions are to be sent, a list of channelization codes that are to be used for the RACH etc.

For FDD mode, the transmitted system information comprises information such as the details of the RACH preambles and available signature sequences. When the user equipment wishes to send a random access channel message, it transmits a signature sequence of length 12 timeslots. Upon receiving an acknowledgement for the preamble, the user equipment then transmits a RACH message that is either of 15 timeslots or 30 timeslots duration (i.e. it sends a RACH for either one or two whole frames).

In cellular communication systems, different duplexing modes may be used. In particular, the following two broad classifications may be used:

Full Duplex (FD) mode. In full duplex mode, the base station and the user equipment can transmit at the same time. Thus, uplink and downlink transmissions may occur simultaneously for a single user equipment. Orthogonality between the uplink and downlink is achieved by assigning the uplink for transmission on one frequency and the downlink for transmission on another frequency. Full duplex mode hence uses a paired spectrum approach.

Half Duplex (HD) mode. In half duplex mode, transmissions from a base station to a user equipment never occur simultaneously with transmissions from a user equipment to the base station. Thus, for a single user equipment, uplink and downlink transmissions are never simultaneous. Orthogonality between uplink and downlink transmissions can specifically be maintained by assigning uplink transmissions to some timeslots and downlink transmissions to other timeslots. The half duplex mode can be used with both paired and unpaired spectrum allocations:

Unpaired Spectrum. Unpaired spectrum uses a single carrier both for uplink transmissions and downlink transmissions and these are separated in time. Both the user equipment and the base station operate strictly in half duplex mode, i.e. both the user equipment and base station either transmit or receive on the carrier frequency but do not simultaneously transmit and receive.

Paired Spectrum. Paired spectrum uses a different frequency carrier for uplink and downlink. Thus, the uplink and downlink are separated in the frequency domain and is further for the individual user equipment separated in the time domain by the half duplex mode of operation. The user equipment operates in a strict half duplex mode where it either transmits or receives. The base station operates in a half duplex mode with respect to any one user equipment, i.e. it either transmits or receives to each user equipment, but can transmit and receive at the same time. Specifically, the base station may transmit to one user equipment while receiving from another user equipment but will never transmit and receive simultaneously for the same user equipment.

The use of different duplexing schemes including paired/unpaired spectrum and half duplex/full duplex modes provides a high degree of flexibility and allows systems to be designed to meet various preferences and requirements. However, conventional systems also have a number of disadvantages.

For example, it is necessary for base stations and user equipments to be compatible with each other and thus to use the same duplexing functionality. For example, a base station may transmit system information in a way that is compatible with the duplexing scheme employed by the base station, and this may be received and decoded by a user equipment using the same duplexing scheme. However, if the user equipment uses a different duplexing scheme, it will not be able to receive the transmissions and therefore will not be able to attach to the base station.

User equipments are known which can support a number of different duplexing capabilities. Such a user equipment must monitor all the duplexing schemes that it can support in order to determine a suitable duplexing scheme for the base station to which it is attempting to attach. Such an approach is inflexible and results in high equipment complexity and complex operation.

Furthermore, known approaches do not allow a full utilization of the duplexing capabilities of the base stations and the user equipments. For example, scheduling by the network may not be able to flexibly adapt to, and select between, a plurality of different duplexing capabilities in order to optimize performance.

Hence, an improved system would be advantageous and in particular a system allowing increased flexibility, improved utilization of duplexing capabilities, improved adaptation, reduced complexity, facilitated operation, improved compatibility and/or improved performance would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention, there is provided a cellular communication system comprising base stations supporting user equipments, the cellular communication system comprising: a first base station serving at least a first user equipment and comprising means for transmitting a base station duplex capability message to user equipments using a common transmission format, the common transmission format being common to a plurality of duplex modes.

The invention allows improved performance in a cellular communication system. An improved utilization of duplexing capabilities may be achieved. Improved interaction and/or coexistence of equipment having different duplexing capabilities may be achieved. A facilitated cell attachment for user equipments may in particular be achieved. For example, a single monitoring of base station duplexing capability information may be performed and the requirement for individual monitoring of different transmissions for different duplexing modes may be obviated or reduced.

According to an optional feature of the invention, a first of the plurality of duplex modes is a paired spectrum duplex mode using paired uplink and downlink frequency carriers and a second of the plurality of duplex modes is an unpaired spectrum duplex mode using a single frequency carrier for uplink and downlink.

The invention may allow improved performance in a system using both paired and unpaired spectrum duplex modes. An improved and/or facilitated interaction or coexistence between equipment using paired spectrum duplex mode and equipment using unpaired spectrum duplex mode may be achieved. The paired spectrum duplex mode may utilize one frequency for uplink transmissions and a different paired frequency for the downlink transmissions. The unpaired spectrum duplex mode may use the same frequency carrier for both uplink and downlink transmissions.

According to an optional feature of the invention, a first duplex mode of the plurality of duplex modes is a half duplex mode and a second duplex mode of the plurality of duplex modes is a full duplex mode.

The invention may allow improved performance in a system using both half duplex and full duplex modes. An improved and/or facilitated interaction or coexistence between equipment using half duplex mode and equipment using full duplex mode may be achieved. In half duplex mode, uplink and downlink transmissions do not coincide for an individual user equipment. In full duplex mode, uplink and downlink transmissions may coincide for the same individual user equipment.

According to an optional feature of the invention, the first and second duplex modes are paired spectrum duplex modes.

The invention may allow improved performance in communication systems using both half duplex and full duplex paired spectrum communications. For example, some user equipments utilizing paired spectrum communication may be able to receive and transmit simultaneously whereas other user equipments may not be able to do so. In such systems, individual optimization may be provided.

According to an optional feature of the invention, the common transmission format comprises one or more common transmission parameters from the group consisting of:
 a. channel bandwidth;
 b. coding rate;
 c. modulation scheme;
 d. n interleaving;
 e. coding scheme; and
 f. timing.

This may allow reduced complexity and/or facilitated operation. Specifically, in some embodiments, simplified receive operation for the user equipment may be achieved resulting in reduced complexity and/or reduced processing resource requirements.

According to an optional feature of the invention, the first user equipment comprises: means for receiving the base station duplex capability message; means for determining at least one transmit characteristic for an access message in response to the base station duplex capability message; and means for transmitting the access message to the first base station using the at least one transmit characteristic.

This may allow improved performance in a cellular communication system. The feature may allow a user equipment to adapt to the duplexing capability of the base station. The user equipment may specifically select between different possible duplexing modes by selecting the transmit characteristic accordingly.

According to an optional feature of the invention, the means for determining the at least one transmit characteristic is arranged to determine a carrier frequency for the access message as a carrier frequency of the base station duplex capability message if the base station duplex capability message indicates that the first base station supports only an unpaired spectrum duplex mode operation, and to determine the carrier frequency as a frequency paired to the carrier frequency of the base station duplex capability message if the base station duplex capability message indicates that the first base station supports a paired spectrum duplex mode operation.

This may allow for improved performance and/or facilitated operation. The feature may provide a practical means of adapting the user equipment to the duplexing capabilities of the base station.

According to an optional feature of the invention, the first user equipment comprises: means for determining a duplex capability of the first base station in response to the base station duplex capability message; and means for evaluating a match criterion between a duplex capability of the first user equipment and the duplex capability of the first base station; and wherein the first user equipment is arranged to only transmit an access message to the first base station if the match criterion is met.

The match criterion may for example determine whether the duplex capability of the first base station and the first user equipment are compatible. The feature may allow improved performance by facilitating coexistence of equipment having different duplexing capabilities in the same system. For example, the feature may ensure that user equipments only attach to base stations with which they can communicate using a compatible duplexing mode.

According to an optional feature of the invention, the first user equipment comprises means for transmitting a user equipment duplex capability characteristic to the first base station.

This may improve performance and may allow the base station and the fixed network to optimize for, and adapt to, the duplexing capabilities of the first user equipment.

According to an optional feature of the invention, the cellular communication system further comprises a scheduler for scheduling communication with the first user equipment in response to the user equipment duplex capability characteristic.

This may allow improved scheduling and/or an optimization for the duplexing capabilities of the first user equipment. An improved scheduling may be achieved resulting in improved resource utilization and thus an improved performance of the cellular communication system as a whole.

According to an optional feature of the invention, the user equipment duplex capability is indicative of a capability of the first user equipment to support a half duplex mode or a full duplex mode. The half duplex mode and the full duplex mode may be paired spectrum duplex modes.

This may allow an improved optimization depending on the half duplex or full duplex mode capabilities of the user equipment. In particular, paired spectrum duplex modes may comprise both a half duplex mode and a full duplex mode and the performance and particularly the scheduling operation may be optimized for the specific mode currently used.

According to an optional feature of the invention, the scheduler is arranged to schedule communication subject to an uplink and downlink time orthogonality restriction for the half duplex mode; and to schedule communication with no uplink and downlink time orthogonality restriction for the full duplex mode.

This allows improved scheduling which takes into the account the specific limitations of the user equipment thereby allowing scheduling performance to be optimized for the current conditions. This may reduce resource usage and may improve performance of the communication system as a whole.

According to an optional feature of the invention, the first user equipment is arranged to comprise the user equipment duplex capability characteristic in an access message.

This may provide a practical, low complexity and/or efficient means of communicating the user equipment duplex capability to the first base station. The access message may for example be a 3GPP RRC CONNECTION REQUEST message carried on a RACH transport channel or the equivalent message in a system evolved from 3GPP.

According to an optional feature of the invention, the first user equipment is arranged to comprise the user equipment duplex capability characteristic in a communication confirmation message.

This may provide a practical, low complexity and/or efficient means of communicating the user equipment duplex capability to the first base station. The access message may for example be a 3GPP RRC CONNECTION SETUP COMPLETE" message or the equivalent message in a system evolved from 3GPP.

According to an optional feature of the invention, the cellular communication system further comprises means for supporting a call setup procedure using a communication scheme common to the plurality of duplex modes.

This may allow improved and/or facilitated call setup. In particular, it may allow a common call setup procedure for different duplex modes thereby allowing specific adaptation to specific duplex mode to be delayed. The communication scheme may for example comply with the common transmission format. Specifically, the user equipment may request or initiate a new call setup using a signaling channel which is common to the plurality of duplex modes.

According to an optional feature of the invention, the first base station is arranged to communicate with the first user equipment during a call setup process using a half duplex mode of operation until a duplex capability characteristic is received from the first user equipment.

This may allow a practical and/or facilitated and/or improved call setup procedure.

According to an optional feature of the invention, the first base station is arranged to communicate with the first user equipment during a call setup process using a half duplex mode of operation; and the first user equipment is arranged to ignore downlink transmissions in time intervals used for uplink transmissions from the first user equipment to the first base station.

This may facilitate operation and/or reduce complexity.

According to an optional feature of the invention, the cellular communication system is arranged to support communications in accordance with the $3^{rd}$ Generation Partnership Project Technical Specifications.

The invention may improve performance of a 3GPP cellular communication system and to systems evolved from 3G.

According to an optional feature of the invention, the cellular communication system is arranged to support communications in accordance with the Global System for Mobile communication system Recommendations.

The invention may improve performance of a GSM cellular communication system.

According to another aspect of the invention, there is provided a base station for cellular communication system comprising base stations supporting user equipments, the base station comprising: means for transmitting a base station duplex capability message to user equipments using a common transmission format, the common transmission format being common to a plurality of duplex modes.

According to another aspect of the invention, there is provided a user equipment for a cellular communication system comprising base stations supporting user equipments, the user equipment comprising: means for receiving a base station duplex capability message from a first base station; means for determining at least one transmit characteristic for an access message in response to the base station duplex capability message; and means for transmitting the access message to the first base station using the at least one transmit characteristic.

According to another aspect of the invention, there is provided a method of operation in a cellular communication system comprising base stations supporting user equipments, the method comprising: a first base station serving at least a first user equipment; and the first base station transmitting a base station duplex capability message to user equipments using a common transmission format that is common to a plurality of duplex modes.

According to another aspect of the invention, there is provided a method of operation for a user equipment of a cellular communication system comprising base stations supporting user equipments, the method comprising: receiving a base station duplex capability message from a first base station; determining at least one transmit characteristic for an access message in response to the base station duplex capability message; and transmitting the access message to the first base station using the at least one transmit characteristic.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE INVENTION

The following description focuses on embodiments of the invention applicable to a 3GPP cellular communication system comprising base stations having different duplexing capabilities. However, it will be appreciated that the invention is not limited to this application but may be applied to many other cellular communication systems including for example the Global System for Mobile communication system (GSM).

Figure 2:
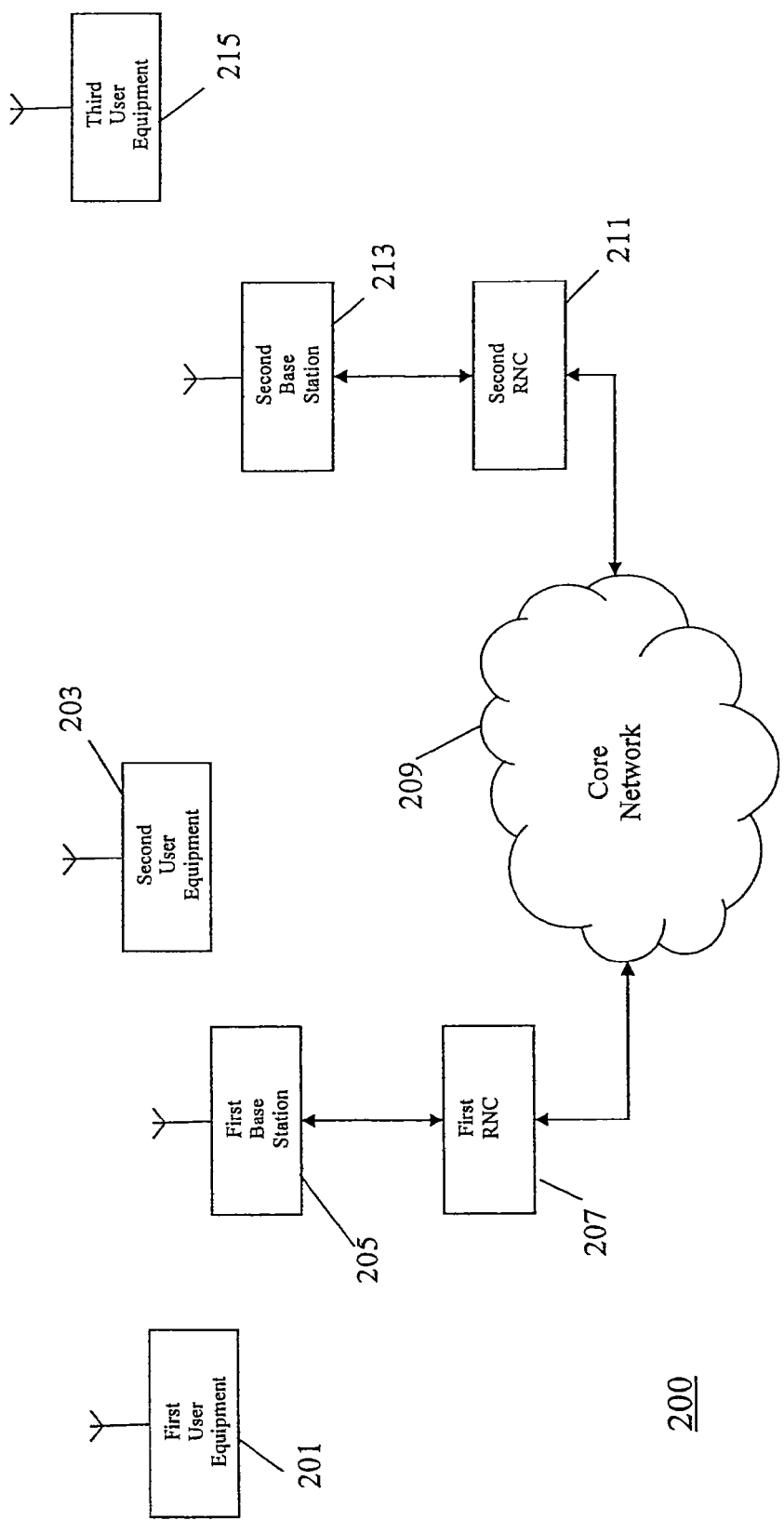
FIG. 2 illustrates an example of a cellular communication system in accordance with some embodiments of the invention.

FIG. 2 illustrates an example of a 3GPP UMTS cellular communication system in which embodiments of the invention may be employed.

In the example of FIG. 2, a first user equipment 201 and a second user equipment 203 are in a first cell supported by a first base station 205.

The user equipments may e.g. be $3^{rd}$ Generation User Equipment (UE), communication units, subscriber units, mobile stations, communication terminals, personal digital assistants, cellular phones, laptop computers, embedded communication processors or any physical, functional or logical communication element which is capable of communicating over the air interface of the cellular communication system.

The first base station 205 is coupled to a first RNC 207. An RNC performs many of the control functions related to the air interface including radio resource management and routing of data to and from appropriate base stations.

The first RNC 207 is coupled to a core network 209. A core network interconnects RNCs and is operable to route data between any two RNCs, thereby enabling a user equipment in a cell to communicate with a user equipment in any other cell. In addition, a core network comprises gateway functions for interconnecting to external networks such as the Public Switched Telephone Network (PSTN), thereby allowing user equipments to communicate with landline telephones and other communication terminals connected by a landline. Furthermore, the core network comprises much of the functionality required for managing a conventional cellular communication network including functionality for routing data, admission control, resource allocation, subscriber billing, user equipment authentication etc.

The core network 209 is further coupled to a second RNC 211 which is coupled to a second base station 213. The second base station 213 supports a third user equipment 215.

Figure 1:
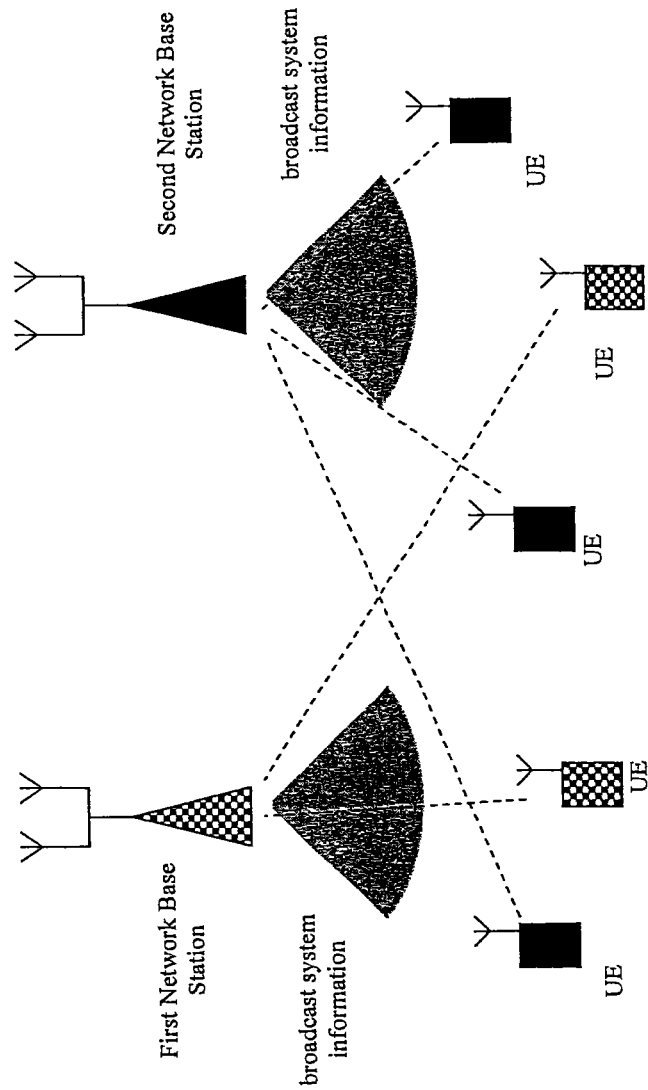
FIG. 1 is an illustration of a cellular communication system in accordance with the prior art.

In the system of FIG. 1, the base stations have different capabilities. Specifically, some base stations may be arranged to support a TDD mode of operation wherein a single carrier frequency is used both for the uplink and for the downlink. Other base stations may be arranged to support an FDD mode of operation wherein paired spectrum carriers are used for the uplink and downlink. Thus, some base stations may use FDD with paired spectrum whereas other base stations use an unpaired spectrum with the TDD operation.

Figure 3:
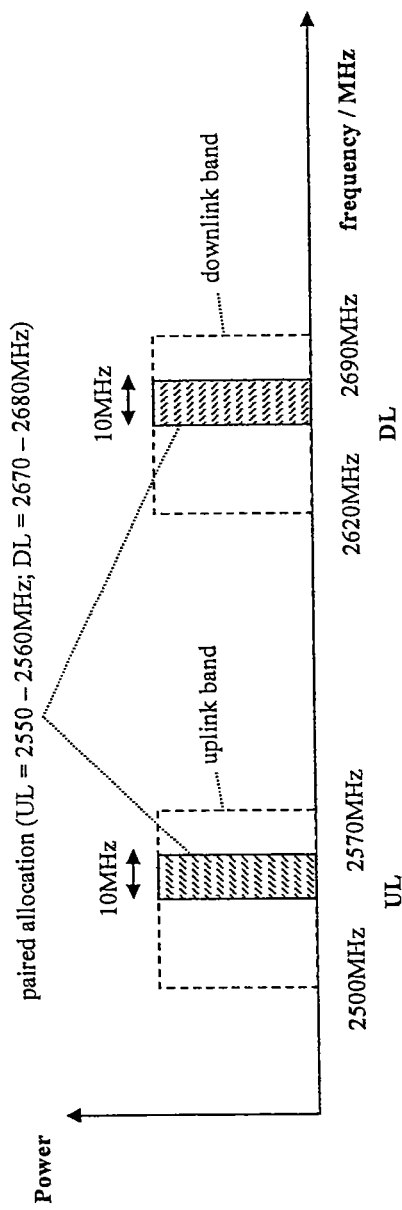
FIG. 3 illustrates an example of frequencies used in a paired spectrum.

An example of frequencies used in a paired spectrum system is shown in FIG. 3. In this figure, uplink transmissions are transmitted in the frequency range 2550-2560 MHz and downlink transmissions are transmitted in the frequency range 2670-2680 MHz. This paired spectrum can either be used in full duplex mode or in half duplex mode.

Figure 4:
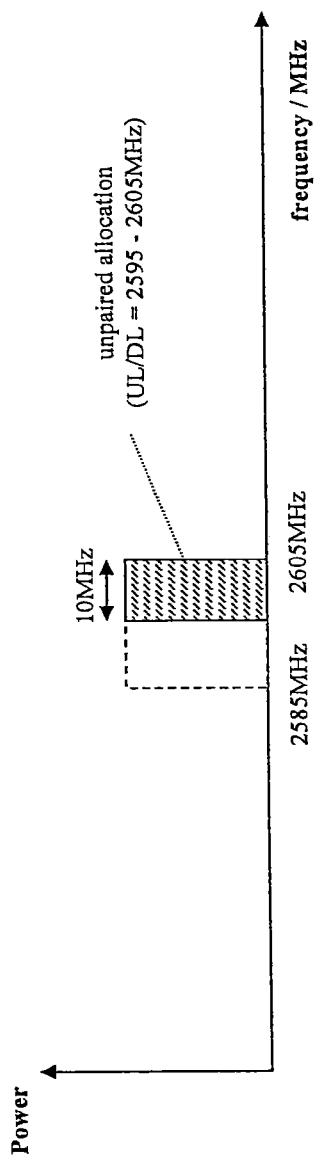
FIG. 4 illustrates an example of frequencies used in an unpaired spectrum.

An example of frequencies used in an unpaired spectrum is shown in FIG. 4. In this example, both uplink and downlink transmissions are transmitted in the frequency range 2595-2605 MHz. This unpaired spectrum can be used in half duplex mode.

A user equipment attaching to the system will initially attempt to identify the most suitable base station based on suitable criteria such as the signal strength, network identity etc. Having chosen a suitable base station to attach to, the user equipment then sends a message to the selected base station informing the network of the user equipment's desire to attach to that base station. This connection request type message is typically sent on a random access channel (RACH). In a 3GPP system, the message "RRC CONNECTION REQUEST" is used to this purpose. This message contains details that affect the connection that will be set up. The connection request message can e.g. comprise information such as:

user equipment identity (such as the International Mobile Subscriber Identity: IMSI). Signal measurements (such as the received beacon signal levels).

The network responds to the communication request message with a connection setup message. In 3GPP systems, the "RRC CONNECTION SETUP" message can be considered a communication setup message. The communication setup message can e.g. comprise information such as:
 a temporary identity for the user equipment,
 details of uplink and downlink radio bearers,
 details of parameters used for paging.

The user equipment then responds to the communication setup message with a connection setup complete message. In 3GPP systems, this message may correspond to the "RRC CONNECTION SETUP COMPLETE" message. The connection setup complete message may for example comprise information such as:
 User equipment capability (for example, the data rate that can be supported by the user equipment, the functions that the user equipment supports etc.).
 security related information.

In 3GPP systems, a user equipment searching for a suitable serving cell, will typically monitor a number of carrier frequencies stored in a preconfigured list. It will then select the base station that provides the best signal under the current conditions.

In 3GPP systems, the base stations broadcast system information comprising information of the random access channel to be used. This information is used to select and configure the appropriate random access requests. However, in conventional systems, different duplexing methods are treated separately and independently.

Specifically, a user equipment using a TDD unpaired spectrum duplexing mode, decodes this signaling information and uses it to determine the time slot numbers and channelization codes to be used for RACH transmissions. The appropriate transmit frequency is determined directly as the same frequency as that used for receiving the system information.

For a user equipment using an FDD paired spectrum duplexing mode, the system information comprises information such as the details of the RACH preambles and available signature sequences to be used. When the user equipment wishes to send a random access channel message, it transmits a signature sequence of length 12 timeslots. Upon receiving an acknowledgement to the preamble, the user equipment then transmits a RACH that is either of 15 timeslots or 30 timeslots duration (i.e. it sends a RACH for either one or two whole frames).

Furthermore, the 3GPP specifications explicitly specify a relationship between uplink and downlink frequencies. Thus, the user equipment can directly calculate the paired uplink frequency from the downlink frequency on which the system information is received.

Figure 5:
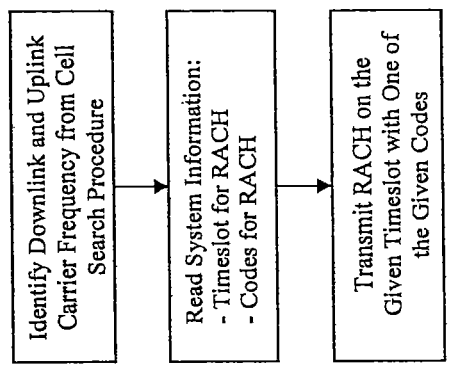
FIG. 5 illustrates a method of determining a random access channel for TDD operation.
Figure 6:
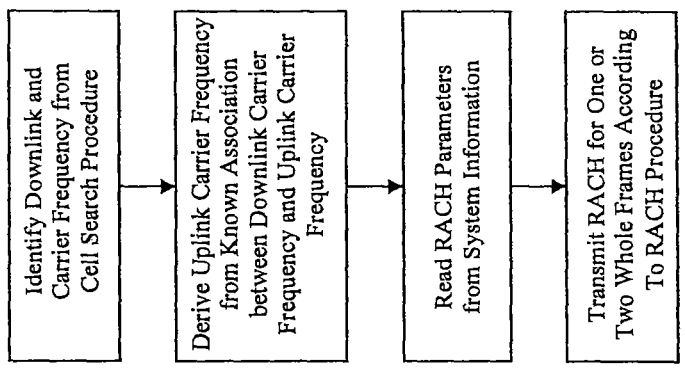
FIG. 6 illustrates a method of determining a random access channel for FDD operation.

FIG. 5 illustrates a method of determining a suitable random access channel for TDD operation and FIG. 6 illustrates a method of determining a suitable random access channel for FDD operation.

In conventional systems, different duplexing modes have different access procedures and the determination of the appropriate RACH characteristics depend on the specific duplexing mode that the user equipment and the base station use. Specifically, a user equipment which is capable of accessing both an FDD and a TDD base station must independently search for these base stations. Thus, the user equipment must first monitor for FDD system information and use this to determine a suitable FDD access channel and must then monitor for TDD system information and use this to determine a suitable TDD access channel. This results in a complex, slow, resource demanding and inconvenient access approach.

In the system of FIG. 2, the first base station 205 comprises functionality for transmitting a base station duplex capability message to user equipments 201, 203 using a transmission format which is common to different duplex modes. Specifically, the first base station 205 transmits system information using a transmit format which is the same irregardless of whether the first base station 205 is a base station using paired or unpaired spectrum and irregardless of whether the base station can support full duplex or only half duplex. Specifically, a TDD and FDD base station can transmit the system information on the same frequency and using the same transmissions schemes.

The duplex capability message provides information of what duplex modes are supported by the first base station 205. The duplex capability message can thus indicate if the base station can support paired/unpaired spectrum and/or full duplex/half duplex modes. The duplex capability message is transmitted using a signal structure that is common to both paired and unpaired operation.

Figure 7:
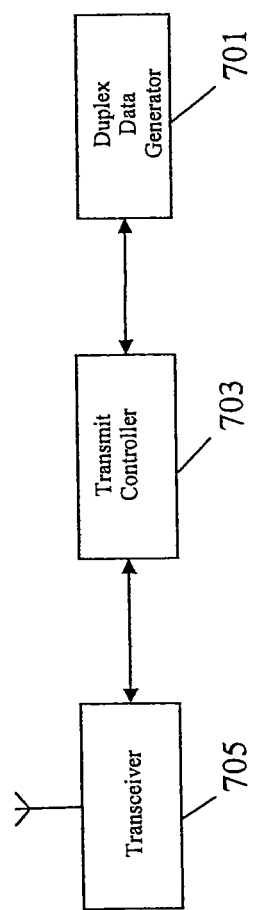
FIG. 7 illustrates an example of a base station in accordance with some embodiments of the invention.

FIG. 7—illustrates the first base station 205 of FIG. 2 in more detail. The base station 205 comprises a duplex data generator 701 which is coupled to a transmit controller 703 which is coupled to a transceiver 705.

The duplex data generator 701 generates duplex information to be broadcast by the base station 205. The duplex information can specifically identify whether the base station is a base station that uses paired or unpaired spectrum. If the base station uses paired spectrum, the duplex information furthermore indicates whether the base station can support half duplex mode user equipments, full duplex mode user equipments or both half duplex and full duplex modes user equipments.

The duplex data is sent to the transmit controller 703 which embeds the data into a suitable system information message that is to be broadcast. The transmit controller 703 may combine the duplex data with data received from other functional entities and which is broadcast for other purposes. The transmit controller 703 thus generates a broadcast system information message and controls the transceiver 705 to broadcast this message on a suitable channel.

The transmit controller 703 specifically controls the transceiver to broadcast a duplex capability message in the form of the system information broadcast message. The transmit controller 703 also controls the transmit format which is used for the message. The same transmit format is used regardless of what duplex capability the base station has. The transmit controller 703 thus controls the transceiver to transmit the duplex capability message in the same time slots and using the same carrier frequency irregardless of the specific duplex capability of the base station 205. The broadcast message is furthermore transmitted using the same spreading code, modulation scheme, error correcting scheme, channel bandwidth, data rate, interleaving scheme and other transmission parameters.

Accordingly, the user equipments 201, 203 need only receive a single message with well known predetermined parameters in order to determine the duplex capability of the base station 205.

A first user equipment 201 seeking to attach to the system can decode the received duplex capability message and use the resulting information to determine a suitable access channel and access transmissions scheme. The first user equipment 201 can furthermore use the received duplex capability information to determine if the capability of the first user equipment 201 is compatible with that of the first base station 205.

Figure 8:
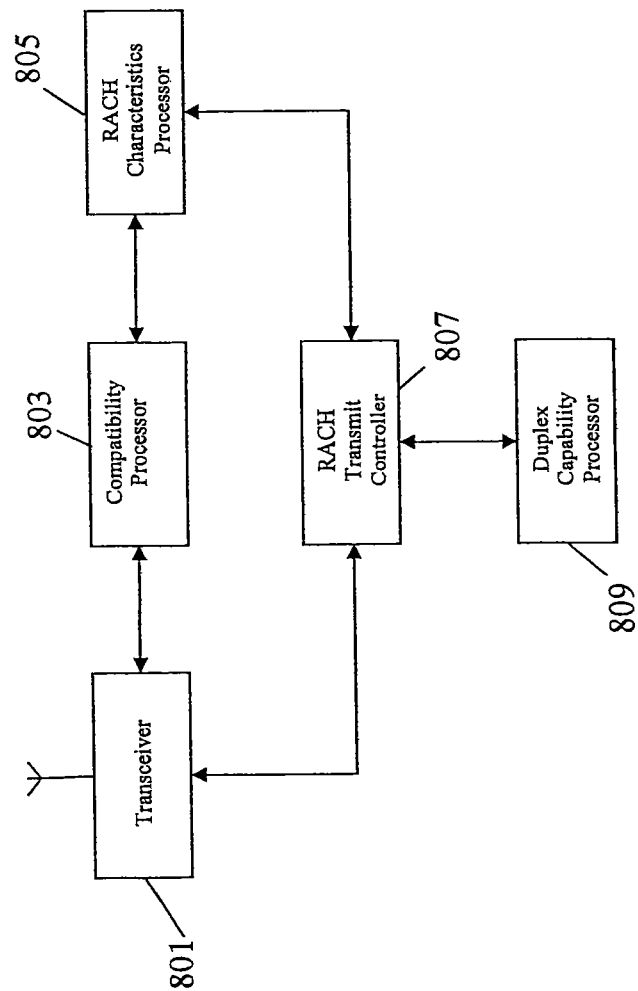
FIG. 8 illustrates an example of a user equipment in accordance with some embodiments of the invention.

FIG. 8 illustrates the first user equipment 201 in more detail. The user equipment 201 comprises a transceiver 801. The transceiver 801 is operable to monitor for the duplex capability message from the first base station 205. Specifically, the transceiver 801 receives a predetermined carrier frequency at the predetermined time slots used for the communication channel that carries the duplex capability message. For example, the duplex capability message may be comprised in a system information message which is monitored and received by the transceiver 801.

As the same transmission format is used for different duplexing modes, the transceiver 801 can simply monitor one single channel irregardless of which duplexing mode is employed by the base station 205. The transceiver 801 is coupled to a compatibility processor 803 and when the duplex capability message is received by the transceiver 801, this is forwarded to the compatibility processor 803.

The compatibility processor 803 is arranged to evaluate a match criterion for the duplex capabilities of the first user equipment 201 and the first base station 205.

The compatibility processor 803 may specifically determine which duplexing mode is used by the base station and may compare this to the duplexing mode(s) which can be supported by the user equipment 201. If none of the duplexing modes that can be supported by the base station 205 can be supported by the first user equipment 201, the compatibility processor 803 determines that the match criterion has not been met and causes the user equipment to abandon the first base station 205 to search for another suitable base station to attach to.

If the first user equipment 201 and the first base station 205 can support the same duplexing mode, the compatibility processor 803 causes the user equipment 201 to prepare to attach to the first base station 205.

For example, the duplex capability message may indicate that the base station 205 uses unpaired spectrum. If the first user equipment 201 can only support paired spectrum, the compatibility processor 803 controls the user equipment 201 to search for another base station as the first base station 205 cannot support the user equipment 201. However, if the first user equipment 201 also supports unpaired spectrum, the first base station 205 can support the first user equipment 201 and the compatibility processor 803 prepares the user equipment 201 for accessing the first base station 205.

In the example, the compatibility processor 803 is coupled to a RACH characteristics processor 805. When the compatibility processor 803 has identified a compatible base station, the RACH characteristics processor 805 is informed of this. In response, the RACH characteristics processor 805 proceeds to determine suitable characteristics to use for accessing the first base station 205.

Specifically, the RACH characteristics processor 805 identifies the appropriate RACH channel to use. This includes determining the appropriate frequency and timing to use for accessing the first base station using the identified duplex format.

In the specific example, the user equipment 201 is a combined TDD and FDD user equipment which can support both paired and unpaired spectrum modes. In the example, the RACH characteristics processor 805 determines if the identified base station uses paired or unpaired spectrum. If the base station 205 uses paired spectrum, the carrier frequency to be used for any uplink RACH attempts is determined as the carrier frequency in the uplink frequency spectrum which is paired with the carrier frequency used for transmitting the system information in the downlink frequency spectrum. However, if the base station 205 uses unpaired spectrum, the carrier frequency for uplink RACH attempts is determined as the carrier frequency used for the downlink broadcast of system information.

It will be appreciated, that other parameters and characteristics for the RACH channel than the carrier frequency may be determined. For example, a suitable timing, spreading code, signature or other parameter may additionally or alternatively be determined.

The RACH characteristics processor 805 is coupled to a RACH transmit controller 807 which is fed the transmission characteristics determined by the RACH characteristics processor 805 for the access message. The RACH transmit controller 807 is coupled to the transceiver 801 and controls the transmission of the access message using the determined transmission characteristic. Specifically, the RACH transmit controller 807 may generate the access message and feed this to the transceiver at the appropriate time. In addition, it may control the transmission parameters to be applied by the transceiver, such as the appropriate carrier frequency.

Hence, the first user equipment 201 can automatically adapt to the duplexing capability of the first base station 205 without requiring independent monitoring and attachment for each duplexing mode to be supported by the first user equipment 201. Rather, a common process and functionality may be used for any base station thereby reducing the complexity and processing load of the user equipment 201.

In the example of FIG. 8, the first user equipment 201 furthermore comprises functionality for transmitting information of the duplex capability of the user equipment 201 to the first base station 205.

Specifically, the RACH transmit controller 807 is coupled to a duplex capability processor 809 which is arranged to generate duplex data indicative of the duplex capability of the user equipment 201 and to feed this to the RACH transmit controller 807 for transmission to the base station 205.

Specifically, the duplex capability information may be transmitted to the first base station 205 in the access message itself. Alternatively or additionally, the duplex capability information can be transmitted in another message of the call setup procedure. For example, the duplex capability information can be transmitted in a communication complete message transmitted from the user equipment 201 to the first base station 205 in response to a call setup message from the first base station 205.

The duplex capability information from the first user equipment 201 can specify the duplexing modes which can be supported by the user equipment 201. Specifically, the duplex capability information can specify whether the user equipment can support paired and/or unpaired spectrum operation. Additionally or alternatively, the duplex capability information can specify whether the user equipment 201 can support half duplex and/or full duplex operation.

As a specific example, the cellular communication system may comprise some user equipments operating in paired spectrum configurations that are only capable of supporting half duplex operation, whereas other user equipments operating in the paired spectrum configuration can support full duplex wherein uplink and downlink transmissions may occur simultaneously for an individual user equipment. In such systems, the duplex capability information transmitted from user equipments can indicate whether they can support full duplex mode or whether they can only support half duplex mode.

The duplex capability information received from the user equipment 201 can be used by the system to enhance performance and to optimize for the current duplex capabilities of the user equipments. For example, scheduling for user equipments may be performed such that the duplex capability information is taken into account. For example, for user equipments that can only support half duplex mode scheduling can be performed such that uplink and downlink transmissions do not coincide for the individual user equipment whereas scheduling for user equipments that can support full duplex mode can fully utilise all time slots in both directions without any such restrictions. This may allow improved efficiency of scheduling and may improve resource utilisation resulting in improved performance and increased capacity of the cellular communication system as a whole.

In the following, more details of some embodiments of the invention will be described with specific reference to three different duplex capability types of base stations which may frequently occur in a 3GPP cellular communication system.

The first base station type is an unpaired half duplex base station which can only support unpaired spectrum communication that inherently must be half duplex (as uplink and downlink transmissions cannot coincide). The second type is a paired full duplex only mode base station being a base station which supports paired spectrum but which cannot guarantee that uplink and downlink transmissions for the same user equipment do not coincide. The third type is a paired spectrum base station capable of supporting both half duplex and full duplex user equipments, i.e. which comprises a scheduling function that can ensure that uplink and downlink transmissions for a single half duplex user equipment do not coincide. Exemplary operation for the three different scenarios will be described independently.

Unpaired Spectrum Half Duplex Base Station:

In this mode of operation, the base station broadcasts a duplex capability message that indicates that the base station supports the unpaired mode of operation Inherently, the unpaired mode of operation (as used in TDD) results in only half duplex mode being supported.

The user equipments decode the duplex capability message and a specific user equipment can configure its transmitter to transmit access messages on the same carrier frequency as the downlink carrier. The access message requesting a communication can furthermore comprise the duplexing capability information for the user equipment although this is not essential as the base station knows a priori that only half duplex unpaired spectrum mode capable user equipments will connect to the base station.

The base station receives this message and schedules the user equipment as a half duplex unpaired spectrum mode user equipment.

A full duplex paired spectrum mode user equipment is unable to respond to the unpaired spectrum half duplex base station (since it is unable to transmit on the same carrier as the downlink) and hence is not able to attach to this base station (accordingly it will proceed to search for another base station).

Figure 9:
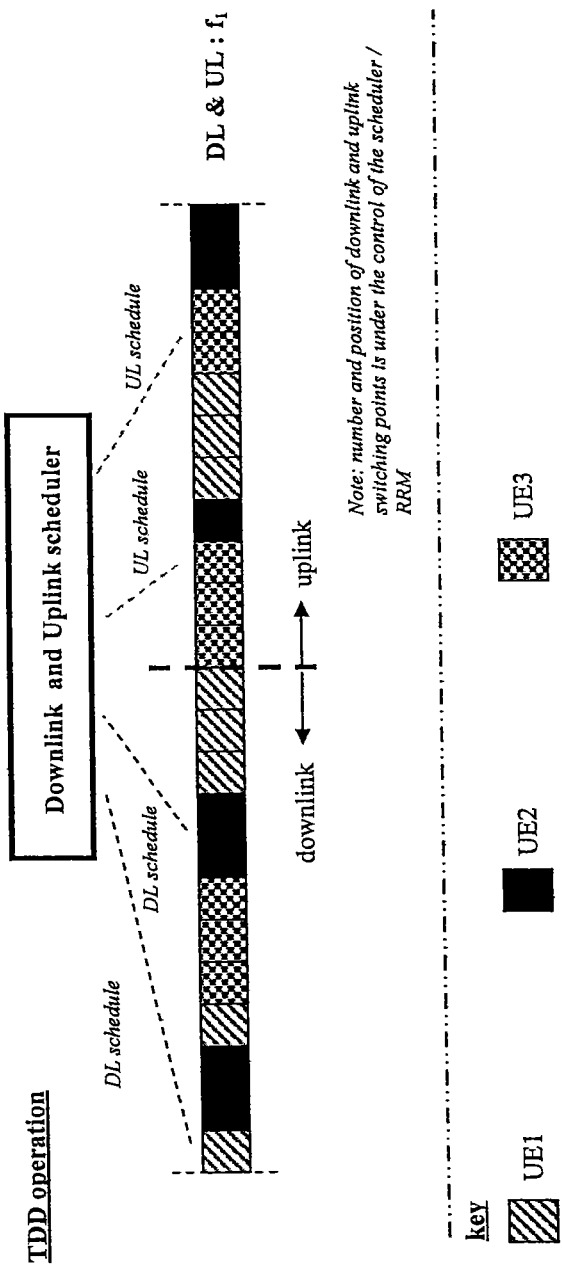
FIG. 9 illustrates an example of scheduling for a half duplex unpaired spectrum duplex mode.

For half duplex mode user equipments operating in unpaired spectrum, uplink transmissions are scheduled at different times to downlink transmissions. This is inherent to the operation of half duplex in unpaired spectrum. An example of such scheduling is illustrated in FIG. 9.

Paired Spectrum Full Duplex only Base Station:

A paired spectrum full duplex only base station is considered to be a base station that can only operate in full duplex mode and which cannot guarantee that uplink and downlink transmissions for the same user equipment do not occur simultaneously (for example due to an architectural decision during design of the base station that the uplink and downlink schedulers will be totally independent).

In this mode of operation, the base station broadcasts a duplex capability message which indicates that the base station supports only full duplex in a paired spectrum.

The user equipments decode the duplex capability message and a paired spectrum full duplex mode capable user equipment can configure its transmitter to transmit access messages on the appropriate paired uplink carrier frequency. The access message requesting a communication can furthermore comprise the duplexing capability information for the user equipment although this is not essential as the base station knows a priori that only full duplex mode capable user equipments will connect to the base station.

A half duplex mode only user equipment will decode the broadcast signal from the base station and will determine that the specific base station is not compatible. Thus, the half duplex mode user equipment does not attempt to attach to the full duplex mode only base station but proceeds to search for other base stations to attach to.

The scheduling for a paired spectrum full duplex only base station is performed according to full duplex rules (and hence uplink and downlink scheduling may be completely independent).

Full duplex mode user equipments require paired spectrum for operation. Full duplex mode user equipments can be scheduled with separate schedulers in the uplink and downlink and these uplink and downlink schedulers do not need to be linked (from the perspective of maintaining an orthogonality rule). Although a full duplex mode user equipment is able to transmit in the uplink and receive in the downlink at the same time, it is not required that the user equipment transmits uplink and receives downlink at the same time (hence a full duplex user equipment can be allocated solely uplink resource, solely downlink resource or both uplink and downlink resource in the same timeslot).

Figure 10:
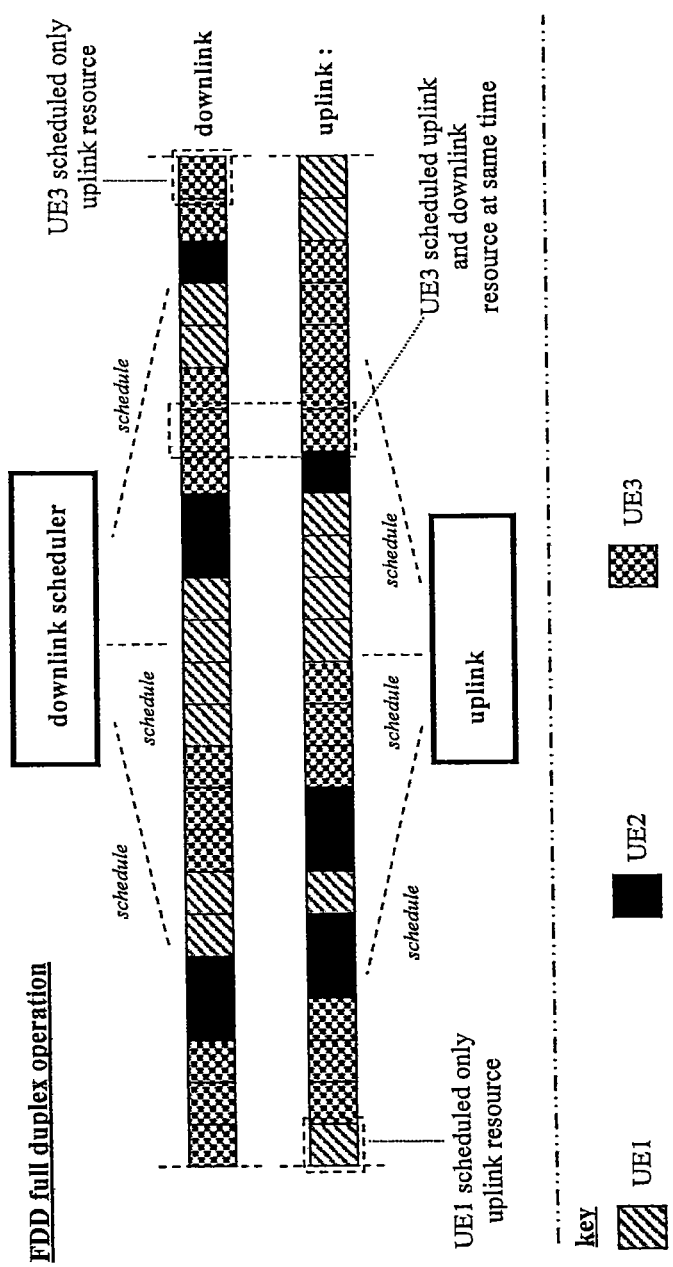
FIG. 10 illustrates an example of scheduling for a full duplex paired spectrum duplex mode.

An example of scheduling in a system with full duplex mode user equipments is illustrated in FIG. 10. FIG. 10 illustrates that the base station can operate with independent uplink and downlink schedulers. The figure also illustrates that some user equipments are allocated solely uplink resource in a timeslot, some user equipments are allocated solely downlink resource in a timeslot and some user equipments are allocated both uplink and downlink resource in a timeslot.

Paired Spectrum Half and Full Duplex Base Station:

A paired spectrum half and full duplex base station is able to serve both half duplex mode user equipments and full duplex mode user equipments operating in the paired spectrum mode.

In this mode of operation, the base station broadcasts a duplex capability message which indicates that the base station supports both full and half duplex modes in a paired spectrum.

The duplex capability message may be decoded by half duplex unpaired, half duplex paired or full duplex paired mode capable user equipments. The half duplex unpaired user equipments will determine that they are not compatible with the base station and will proceed to search for another base station. However, both the full and half duplex paired spectrum user equipments may proceed to access the base station.

Specifically, a full or half duplex mode user equipment can configure its transmitter to transmit on the uplink frequency which is paired with the downlink frequency that the duplex capability message signal is sent on (the uplink frequency can be known a priori or may be signaled e.g. in the duplex capability message).

When a user equipment (either half duplex mode or full duplex mode) wishes to attach to the network, it can transmit an access message using the paired uplink carrier frequency. This message can contain (amongst other things) information of the duplexing capability of the user equipment.

On reception of the duplexing capability information, the base station scheduler schedules user equipments based on whether they are full duplex mode user equipments or half duplex mode user equipments. For half duplex mode user equipments, the scheduler ensures that it never schedules uplink from a user equipment at the same time as scheduling downlink to that user equipment. For a full duplex mode user equipment, the scheduler may schedule uplink and downlink independently. Hence both half duplex and full duplex mode user equipments can be served by the same base station.

Figure 11:
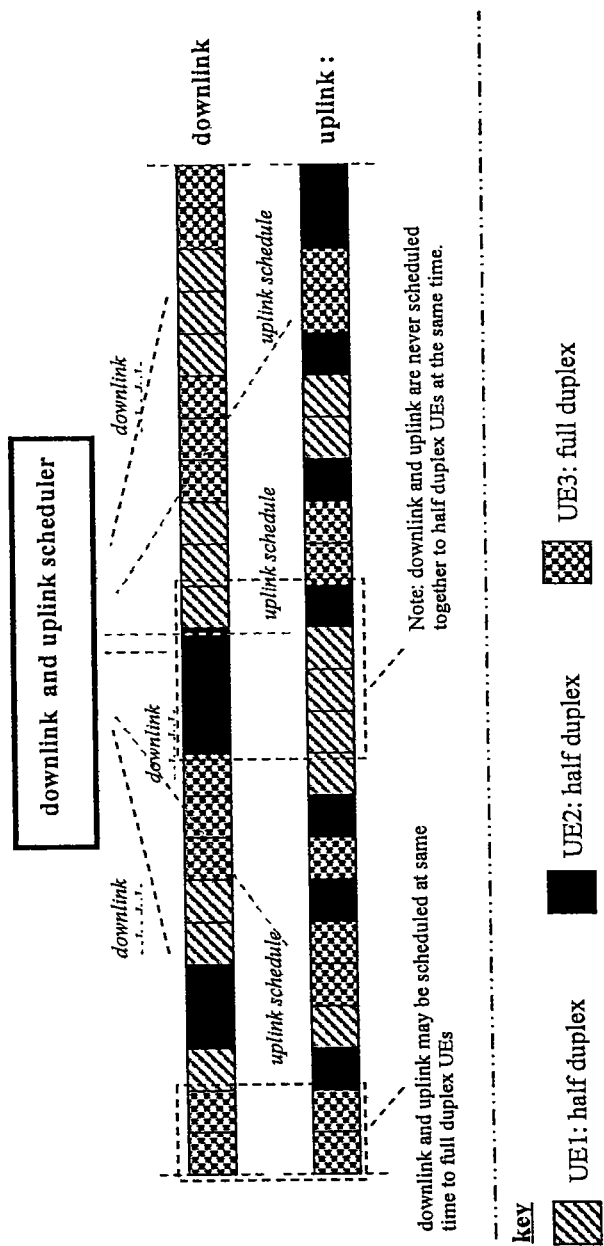
FIG. 11 illustrates an example of scheduling for a half duplex paired spectrum duplex mode.

An example of such scheduling operation is illustrated in FIG. 11.

It will be appreciated that in some embodiments, the base station can assign some timeslots for use exclusively by half duplex mode user equipments and other timeslots to be used exclusively by full duplex mode user equipments.

In some embodiments, the base station may support a call setup procedure using a communication scheme which is common to more than one duplex mode. Specifically, the base station may receive an access request message on the uplink paired spectrum and continue the call setup procedure using half duplex communication i.e. while ensuring that uplink and downlink transmissions do not coincide for the user equipment. This approach may be particularly suitable for embodiments where the duplex capability of the user equipment is not transmitted to the base station until late in the call setup procedure. In the example, the base station can operate in half duplex mode to a user equipment until the base station receives a duplexing capability message from this user equipment.

The base station thus works in essentially two phases from a user equipment perspective. In the initial phase of a connection, the base station preferably operates in strictly half duplex mode to user equipments until the base station receives information of the duplexing capability of the user equipment. After the initial phase of the connection, the base station either operates in full duplex or half duplex modes for the specific user equipment dependent on the duplexing capability of the user equipment.

For the half duplex mode user equipments, the base station schedules the user equipments such that for any individual user equipment, uplink and downlink resources are never scheduled at the same time. The base station is however able to schedule one set of user equipments at time T in the uplink and another set of user equipments at time T in the downlink, but these sets of user equipments must be non-overlapping. However, for the full duplex user equipments, no such restriction is necessary. Thus, the scheduler can schedule communication subject to an uplink and downlink time orthogonality restriction for half duplex mode user equipments, and can schedule communication with no uplink and downlink time orthogonality restriction for the full duplex mode user equipments.

In some embodiments, the base station may operate in full duplex mode for at least some of the call setup procedure for a half duplex user equipment. In such cases, the half duplex user equipment can ignore the downlink transmissions in the time slots for which an uplink transmissions is required.

Figure 12:
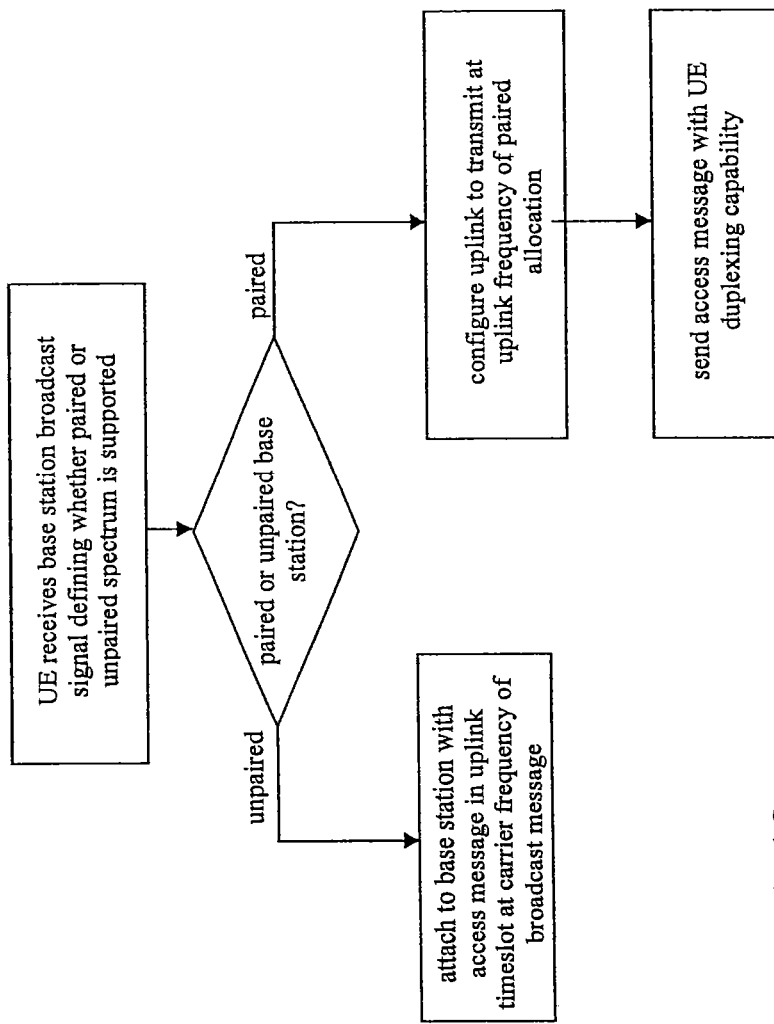
FIG. 12 illustrates a flow chart for an exemplary operation of a user equipment in accordance with some embodiments of the invention.

FIG. 12 illustrates a flow chart for an exemplary operation of a user equipment capable of supporting both paired and unpaired spectrum in accordance with some embodiments of the invention.

Figure 13:
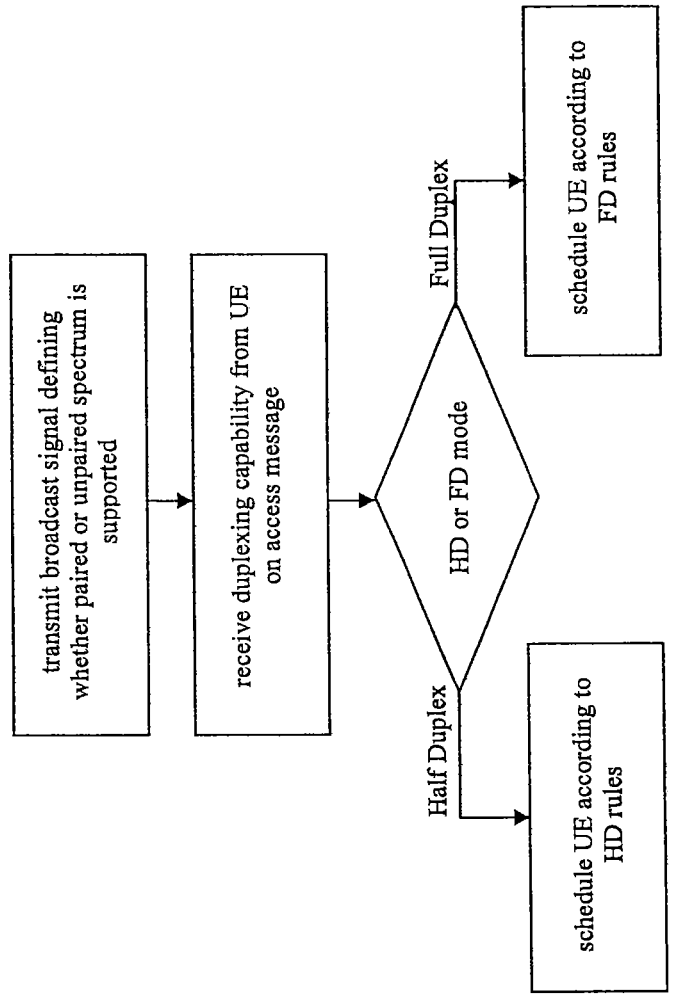
FIG. 13 illustrates a flow chart for an exemplary operation of a base station in accordance with some embodiments of the invention.

FIG. 13 illustrates a flow chart for an exemplary operation of a base station capable of supporting both half and full duplex paired spectrum duplexing in accordance with some embodiments of the invention.

In some embodiments, the user equipment can transmit the duplex capability information to the base station in a communication or access request message. In other embodiments, the user equipment can transmit the duplex capability information to the base station in another message of the call setup procedure. For example, the user equipment may transmit the duplex capability information in a communication confirmation message, which is sent to the base station in confirmation of a communication setup message transmitted from the base station to the user equipment.

For brevity, the communication request or access message will be referred to as a CONREQ message, the communication setup message will be referred to as a CONSETUP message and the communication confirmation message will be referred to as a CONCOMPLETE message. In a 3GPP system, the CONREQ message can be a RRC CONNECTION REQUEST message and the CONCOMPLETE message can be a RRC CONNECTION SETUP COMPLETE message.

Signaling of Duplex Capability in CONREQ

Figure 14:
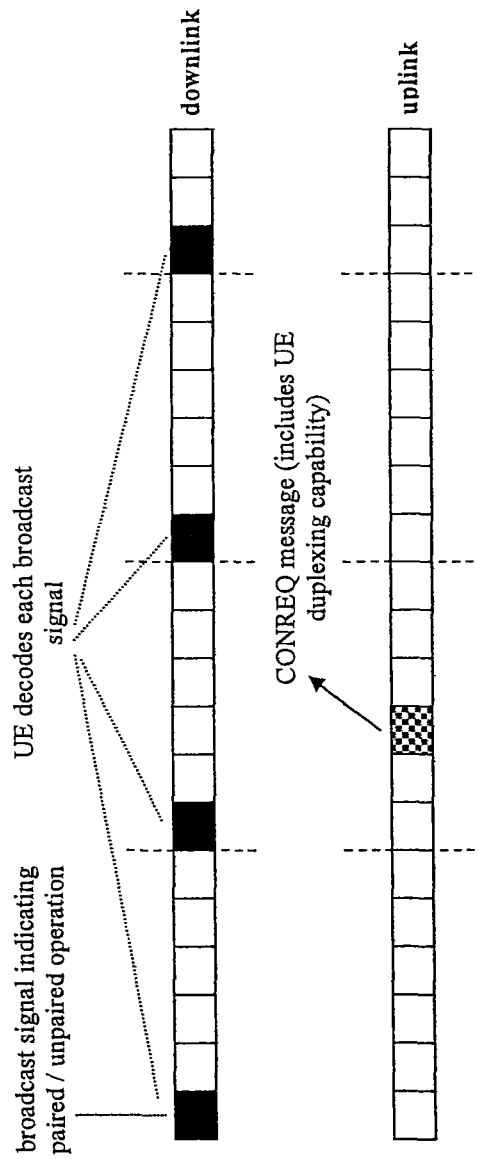
FIG. 14 illustrates a signaling sequence in accordance with some embodiments of the invention.

When the duplexing capability of the user equipment is sent in the CONREQ message, it can be sent using a RACH-type channel. Preferably, the CONREQ message is sent in a timeslot other than (i.e. orthogonal to) the timeslot in which the broadcast transmission from the base station is sent, but this is not strictly required. An example of such operation is illustrated in FIG. 14.

Figure 15:
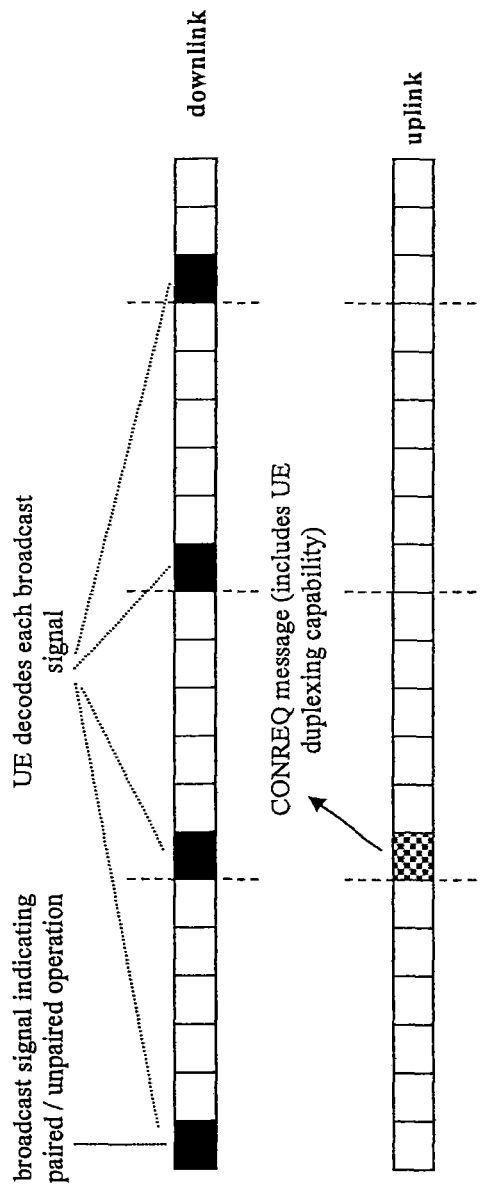
FIG. 15 illustrates a signaling sequence in accordance with some embodiments of the invention.

Alternatively, the CONREQ message can be sent on the same timeslot as used for the duplex capability message from the base station. Such an approach suits a full duplex mode user equipment, but is somewhat less suitable for a half duplex mode user equipment and requires the half duplex mode user equipment to ignore decoding broadcasts from the base station when transmitting the CONREQ message. An example of such operation is illustrated in FIG. 15.

In this example, the user equipment is able to send the CONREQ message in the same timeslot as the broadcast message and is further able to decode the broadcast message even when transmitting the CONREQ message.

Figure 16:
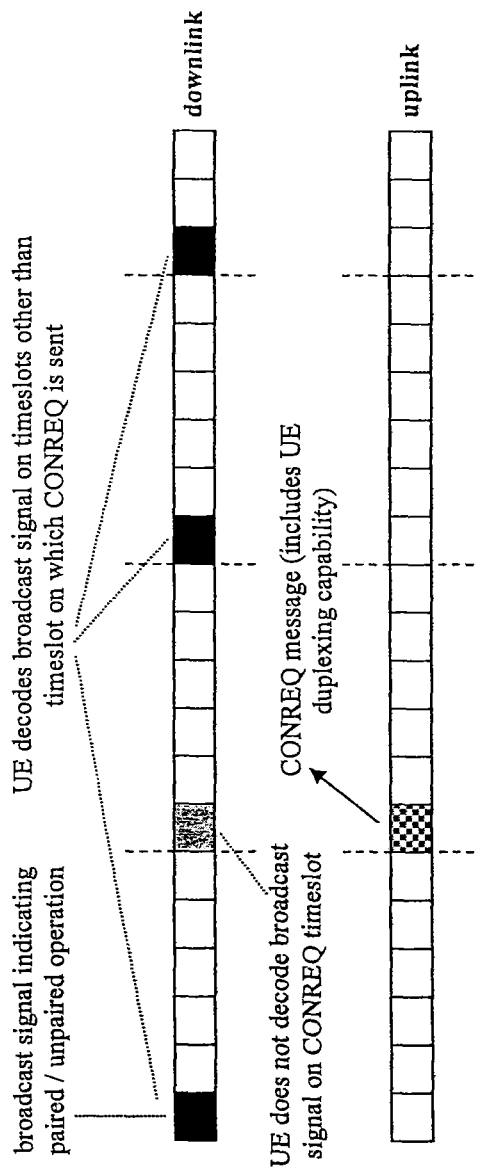
FIG. 16 illustrates a signaling sequence in accordance with some embodiments of the invention.

FIG. 16 illustrates the same type of operation for a half duplex mode user equipment where the half duplex mode user equipment does not decode the broadcast signal on the timeslot in which it sends the CONREQ message (this type of operation is acceptable when the broadcast information is continually refreshed, hence the user equipment can decode the missed broadcast information at a future time).

Signalling of Duplex Capability in CONCOMPLETE

When the duplexing capability is sent in the CONCOMPLETE message, the CONCOMPLETE and CONREQ messages are preferably sent in different timeslots to the broadcast and CONSETUP messages. When different timeslots are used until the CONCOMPLETE message is received by the base station, the base station is essentially assuming half duplex mode operation until the message detailing whether the user equipment is actually half duplex is received by the base station. Since a full duplex user equipment can receive downlink on its own or transmit uplink on its own (as well as transmitting and receiving at the same time), both full duplex mode and half duplex mode user equipments can be served until the base station knows the user equipment's duplexing capability (at which time, the base station can transition to serving the user equipment in the optimum mode—full duplex or half duplex). Thus, the base station assumes operation in half duplex mode until it receives a duplexing capability message from the user equipment.

Figure 17:
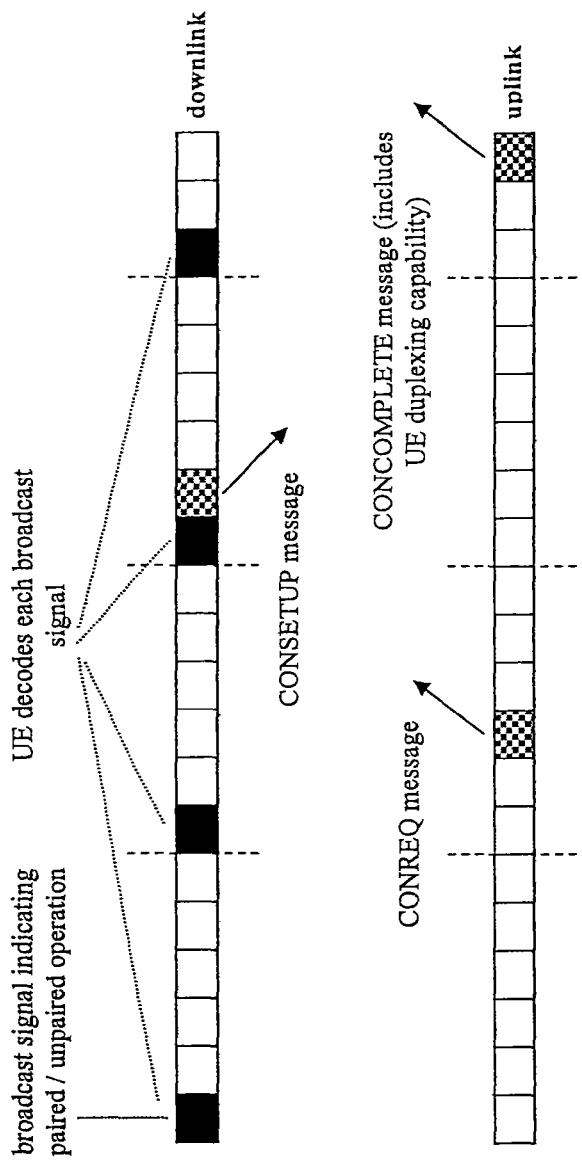
FIG. 17 illustrates a signaling sequence in accordance with some embodiments of the invention.

An example of a signaling sequence adopted when CONCOMPLETE is used to signal the user equipment's duplexing capability is illustrated in FIG. 17. In the example, the signaling sequence is such that the uplink CONREQ/CONCOMPLETE messages are never in the same timeslot as the broadcast or call setup messages from the base station, and hence the signaling sequence is equally applicable to half duplex and full duplex mode capable user equipments.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. An electronic device comprising:
   circuitry configured to
   broadcast duplex capability information to user equipment, the duplex capability information including information identifying a plurality of duplex modes supported by the electronic device, wherein
   the circuitry is configured to broadcast the duplex capability information to the user equipment on a same bandwidth for the plurality of duplex modes;
   receive an access request message requesting to attach to a network transmitted by the user equipment in response to the duplex capability information; and
   receive a communication confirmation message including a user equipment duplex capability characteristic transmitted by the user equipment after the access request message is received.

2. The electronic device of claim 1, wherein the circuitry is further configured to:

receive the access request message transmitted by the user equipment according to at least one of the identified duplex modes.

3. The electronic device of claim 1, wherein the circuitry is further configured to:
allocate a shared channel to the user equipment based on the user equipment duplex capability.

4. The electronic device of claim 1, wherein a first duplex mode of the plurality of duplex modes is a frequency division duplex (FDD) mode and a second duplex mode of the plurality of duplex modes is a time division duplex (TDD) mode.

5. The electronic device of claim 1, wherein a first duplex mode of the plurality of duplex modes is a half-duplex mode and a second duplex mode of the plurality of duplex modes is a full duplex mode.

6. The electronic device of claim 1, wherein
the circuitry is configured to broadcast the duplex capability information to the user equipment according to a signal structure that is common to the plurality of duplex modes, and
the signal structure is defined by one or more common transmission parameters from the group consisting of:
a signal bandwidth;
a coding rate;
a modulation scheme;
an interleaving;
a coding scheme; and
a timing.

7. The electronic device of claim 1, wherein
the user equipment is not attached to the network prior to transmitting the access request message in response to the duplex capability information broadcast by the electronic device.

8. An communication apparatus comprising:
an antenna unit; and
circuitry configured to
broadcast duplex capability information to user equipment, the duplex capability information including information identifying a plurality of duplex modes supported by the electronic device, wherein
the circuitry is configured to broadcast the duplex capability information to the user equipment on a same bandwidth for the plurality of duplex modes;
receive an access request message requesting to attach to a network transmitted by the user equipment in response to the duplex capability message; and
receive a communication confirmation message including a user equipment duplex capability characteristic transmitted by the user equipment after the access request message is received.

9. The communication apparatus of claim 8, wherein the circuitry is further configured to:
receive the access request message transmitted by the user equipment according to at least one of the identified duplex modes.

10. The communication apparatus of claim 8, wherein the circuitry is further configured to:
allocate a shared channel to the user equipment based on the user equipment duplex capability.

11. The communication apparatus of claim 8, wherein a first duplex mode of the plurality of duplex modes is a frequency division duplex (FDD) mode and a second duplex mode of the plurality of duplex modes is a time division duplex (TDD) mode.

12. The communication apparatus of claim 8, wherein a first duplex mode of the plurality of duplex modes is a half-duplex mode and a second duplex mode of the plurality of duplex modes is a full duplex mode.

13. The communication apparatus of claim 8, wherein
the circuitry is configured to broadcast the duplex capability information to the user equipment according to a signal structure that is common to the plurality of duplex modes, and
the signal structure is defined by one or more common transmission parameters from the group consisting of:
a signal bandwidth;
a coding rate;
a modulation scheme;
an interleaving;
a coding scheme; and
a timing.

14. A method comprising:
broadcasting, by a wireless interface, duplex capability information to user equipment, the duplex capability information including information identifying a plurality of duplex modes supported by the electronic device, wherein
the duplex capability information is transmitted to the user equipment on a same bandwidth for the plurality of duplex modes;
receiving an access request message requesting to attach to a network transmitted by the user equipment in response to the duplex capability message; and
receiving a communication confirmation message including a user equipment duplex capability characteristic transmitted by the user equipment after the access request message is received.

15. The method of claim 14, wherein
the receiving includes receiving the access request message transmitted by the user equipment according to at least one of the identified duplex modes.

16. The method of claim 14, further comprising:
allocating a shared channel to the user equipment based on the user equipment duplex capability.

17. The communication apparatus of claim 14, wherein a first duplex mode of the plurality of duplex modes is a frequency division duplex (FDD) mode and a second duplex mode of the plurality of duplex modes is a time division duplex (TDD) mode.

18. The method of claim 14, wherein a first duplex mode of the plurality of duplex modes is a half-duplex mode and a second duplex mode of the plurality of duplex modes is a full duplex mode.

19. The method of claim 14, wherein
the duplex capability information is broadcast to the user equipment according to a signal structure that is common to the plurality of duplex modes, and
the signal structure is defined by one or more common transmission parameters from the group consisting of:
a signal bandwidth;
a coding rate;
a modulation scheme;
an interleaving;
a coding scheme; and
a timing.

* * * * *